UNITED STATES PATENT OFFICE.

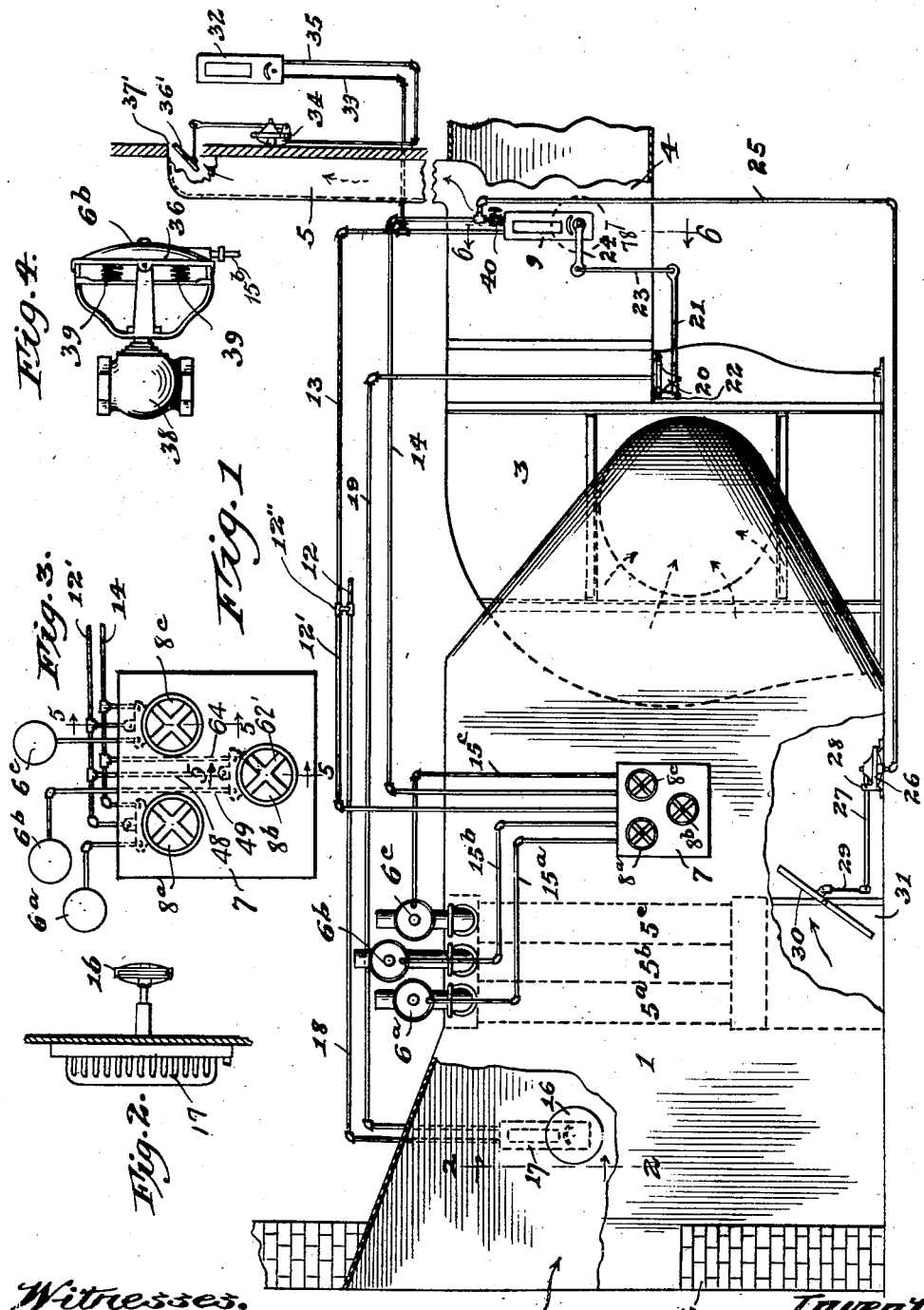

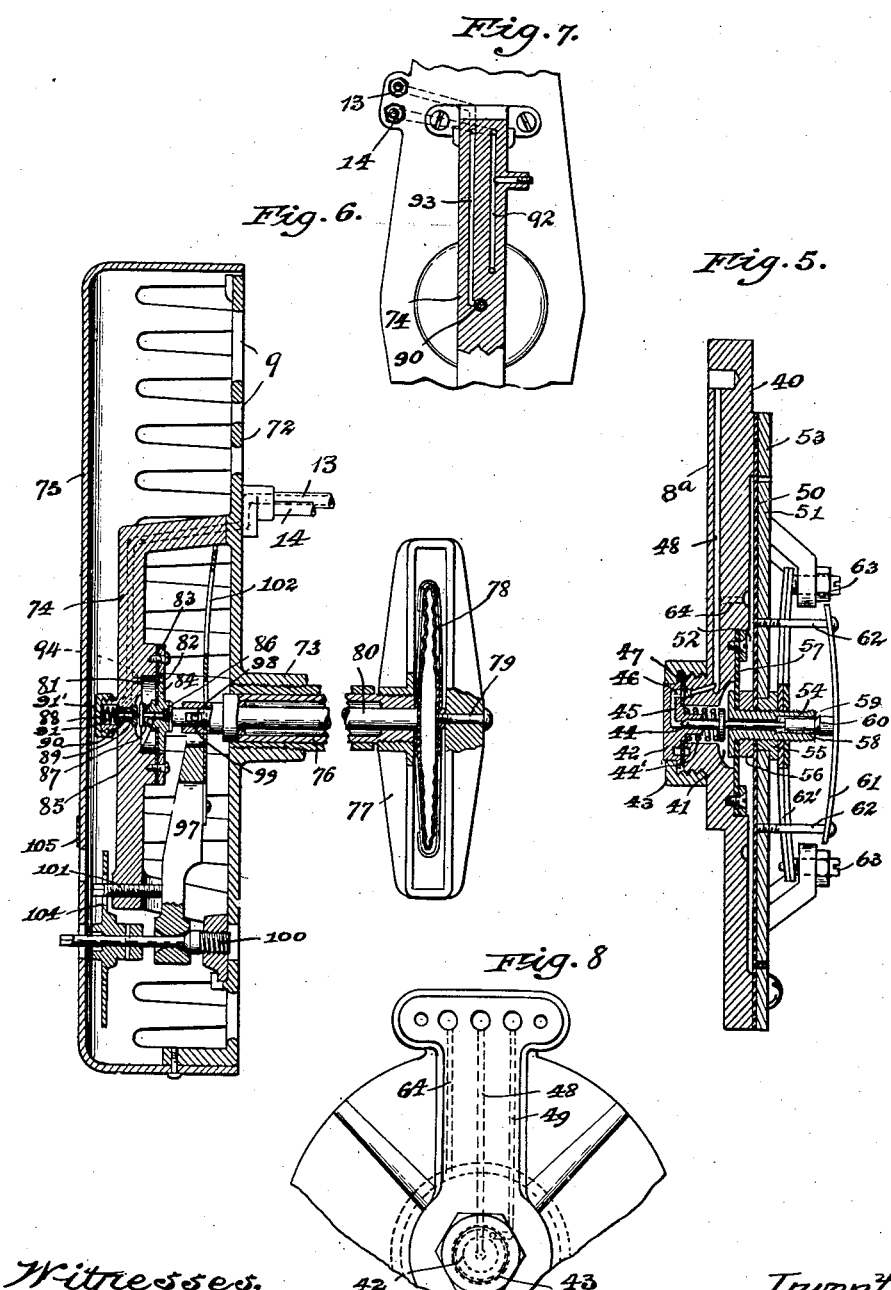

DONALD J. POWERS, OF NEW YORK, N. Y.

AUTOMATICALLY-REGULATED HEATING SYSTEM.

1,065,393.  Specification of Letters Patent.  Patented June 24, 1913.

Application filed June 16, 1910. Serial No. 567,205.

*To all whom it may concern:*

Be it known that I, DONALD J. POWERS, a resident of New York, in the county of New York and State of New York, have invented certain new and useful Improvements in Automatically-Regulated Heating Systems, of which the following is a full, clear, and precise specification.

This invention relates to the art of automatically controlling the temperature of buildings heated by air delivered thereto from the outside through the medium of a fan or blower, the air being properly heated by contact with heat radiating surfaces before distribution, and thereafter delivered through suitable ducts to the apartments to be warmed. The particular embodiment of the invention herein shown and described is of the so-called single duct type, in distinction from those systems using both warm and cold air ducts and mixing dampers.

It becomes important that the supply of air be heated to just the right degree to supply the necessary number of heat units required to maintain a uniform and proper temperature in the building. It is evident that the conditions vary with every change of temperature outside, and more or less heat must be imparted to the incoming air accordingly.

In carrying out this invention I use well-known hot blast heating apparatus, and I locate a thermostat in the main delivery duct so organizing and arranging it as to govern the radiators or heating units, and so maintain the air passing through this duct at any desired temperature; the thermostat being adjustable for any temperature required by the changing weather conditions. Apparatus of this general kind is well-known in the art, and is in common use; the adjustment of the thermostat in the delivery duct being manually effected and therefore dependent upon the judgment and amount of attention given it by the engineer or person in charge.

In my invention I dispense with the attendant, and automatically bring about proper adjustment of the thermostat in the delivery duct from time to time, as required by changing conditions, by means of a second thermostat, which may aptly be called a master thermostat, located in the air passage through which the incoming air is supplied, or at least so located that it will be subject to the outside temperature which is practically identical with that of the incoming air. In the preferred embodiment of my invention this master thermostat is, for the purpose of regulating the secondary thermostat, arranged to deliver graduated air pressure, the pressure being varied in accordance with the temperature conditions surrounding it, and this thermostat is operative over the entire normal range of temperatures below 70°, or below that temperature at which artificial heating will be superfluous. The thermostat is so arranged that the effective air pressure which it controls and transmits for governing purposes, increases and diminishes with the rise and fall, respectively, of the temperature outside. In the preferred embodiment of the invention this master thermostat is arranged to control air supplied under substantially constant pressure, and to transmit this air at a reduced pressure through a suitable tube or duct to a diaphragm motor, which latter is operatively connected with the adjusting apparatus or member of the thermostat, which is located in the main delivery duct and controls the radiators or heaters; the master thermostat thereby serving to effect the adjustment of the heat controlling thermostat, and the latter the temperature of the heating medium, in exact accordance and in instant response to changes in the weather conditions outside. I also provide tempering or graduating means for modifying the temperature of the air which was acted on by the radiator units and such tempering means embodies a by-pass for the admission of limited amounts of outside air to the fan or blower without the air being subject to the action of the heating units, and a graduating damper arranged to control this by-pass; this graduating damper being preferably under the direct control of the secondary thermostat, so that the operation of the damper is in harmony with the rest of the regulation and it operates to effectively graduate the temperature steps produced by the cutting out or bringing in, in succession, of the radiator units.

The object of the present invention therefore is to provide a system of automatic regulation and control which accomplishes the regulation of the temperature of the air through the medium of a thermostatic element subject to the temperature of the air in the main delivery duct and which thermostat is itself regulated by a master thermostat subject to the variable outside temperature conditions.

To the above ends the invention consists in the matters hereinafter described, and more particularly pointed out in the appended claims.

In the accompanying drawing, Figure 1 is a view partly structural and partly diagrammatic showing the various mechanisms arranged in coöperative relation, and regulating parts in intermediate positions. Fig. 2 is a sectional view taken in the plane 2—2 indicated on Fig. 1, showing the manner in which the master thermostat may be mounted on the outside wall of the inlet duct with the thermostatic element extending inside and exposed within said duct; Fig. 3 is an enlarged detail of some of the parts shown in Fig. 1, showing particularly the pipe connections with the relays and between the latter and the valve motors; Fig. 4 is a detail of one of the valve motors. Fig. 5 is a central vertical sectional detail on line 5—5 Fig. 3 through the body and valve mechanism of one of the relays, Fig. 6 is a view partly in side elevation but chiefly in central vertical section, of the main controlling thermostat, Fig. 7 is a fragmentary view partly in section to show the various ducts through the mechanism of Fig. 6, and Fig. 8 is a fragmentary view and face elevation of one of the relays to show the disposition of ducts therein.

In the embodiment shown, an intake chute 1 extends through the building wall 2 and communicates with the outside; the inner end of the chute leading to and connecting with the intake side of a fan 3, which in turn delivers the air to a main delivery duct 4, from which any number of branch ducts, as 5, may lead to the various apartments of the building to be heated. Interposed in the chute 1, between its inlet end and the fan, are a number of heating sections $5^a$, $5^b$ and $5^c$, controlled respectively by pneumatic valve motors $6^a$, $6^b$ and $6^c$, which may be of any well-known construction and in which springs are provided tending to operate against a diaphragm to open the valves; the diaphragm being moved in the opposite direction to close the valves by pneumatic pressure. Such a valve motor is well-known in this art, and is shown in some detail in Fig. 4. Described in general terms, such a motor comprises a diaphragm forming one side of a chamber 36 receiving pneumatic pressure through a pipe $15^b$, the diaphragm being directly connected to the stem of the radiator valve 38 which it operates. Acting upon the diaphragm and against the pneumatic pressure are springs 39 which obviously serve to return the valve when the pneumatic pressure decreases, and thus permit the springs to collapse the diaphragm.

On a suitable board or support 7 are mounted a number of relays $8^a$, $8^b$ and $8^c$. These relays are, or may be, of the same construction as the relays set forth and described in my Letters Patent No. 961,734, granted June 14, 1910. In Patent No. 764,819, granted to W. P. Powers, July 12, 1904, a combined thermostat and relay is shown and described, of which instrument the relay is identical in principle with that shown herein. So also, the thermostat shown in the latter patent, corresponds to the thermostat herein described as arranged to control the relays.

Describing the construction of one of the relays (all of them being alike except that they are by adjustment of their springs set to operate at different pressures), and referring more particularly to Fig. 5, 40 designates a disk-shaped main body provided at its center with a hub-like enlargement, within which is formed a by-pass valve chamber 41, the outer end of which is closed by a cap 42 clamped in position by a screw ring 43. Cap 42 is provided axially with a valve port which is controlled by a by-pass valve 44, and a cross passage 45 formed in the cap communicates at one end with the port controlled by valve 44 and at its opposite end with an annular channel 46 in the cap. Channel 46 overlies a corresponding channel 47 formed in the main body, and a duct 48 leads downwardly from the upper end of the main body through the latter to, and communicates with, the channel 47. A packing disk is interposed between cap 42 and the main body, this disk being apertured to afford free communication between the channels 46 and 47, as seen clearly in the drawing. The sides of the by-pass valve 44 are channeled so that as soon as the valve leaves its seat or bearing against the end of the port, communication is established between the duct 48 and the chamber 41. From the chamber 41 a duct 49 leads out through the body of the valve.

The back face of the valve body 40 is slightly recessed over a relatively large area, and over this is arranged to lie a flexible diaphragm 50 to which is secured a diaphragm plate 51 of nearly the same area as the diaphragm chamber 52 formed by the recess referred to, which it overlies. The periphery of the diaphragm is secured to the valve body 40 by a suitable ring, as indicated at 53, and the center of the diaphragm is secured to an externally threaded valve sleeve 54 between a clamping nut 55 and a space ring 56. The diaphragm chamber 52 is separated from the chamber 41 by a smaller flexible diaphragm 57 having its periphery suitably secured to the valve body 40, and its central portion secured to the valve sleeve 54; the latter being for this purpose headed at its inner end, and the diaphragm 57 interposed between the space ring 56 and the flange of the head. Valve sleeve 54 is axially bored to loosely receive the stem of valve 58; the outer end of the valve sleeve terminating in a conical seat 59 with which coöperates the correspondingly tapered and enlarged or headed end 60 of the valve 58. Valve 58 is normally pressed toward its seat by a bow-spring 61, the central portion of which engages the valve, and the ends of which are carried by screw studs 62 seated in the plate 51. The inner end of the valve member 58 engages the headed end of the valve 44, a coiled expansion spring 44' tending to hold said valve away from its seat. The diaphragm plate 51 with the parts carried thereby is normally pressed inwardly by means of a duplex star-shaped spring 62' having its central portion connected with the valve sleeve 54 and its several radial arms engaged with adjustable studs 63 carried by brackets upon the ring 53 and which overhang the diaphragm plate. From the diaphragm chamber 52 a duct 64 leads out through the main valve body 40.

The operation of the relay is as follows: Assuming that the duct 64 of the relay be connected with a pipe which contains motive fluid under graduated pressure; that the duct 48 be connected with a part of a main supply pipe containing air under the full or unmodified pressure, and that the duct 49 be connected with a pipe leading to the valve motor which is to be actuated through the relay, the by-pass valve 44 will normally be closed and the diaphragm chamber 52 subject to the reduced pressure transmitted through the thermostat and valve 58 will be open to connect chamber 41 with atmosphere. If, now, the pressure in chamber 52 rises sufficiently to force back the larger diaphragm against force of spring 62', the initial movement will result in closing valve 58 (which is normally open) and thereafter permit valve 44 to open. Thereupon pressure will be admitted through duct 48 to the by-pass chamber, thus adding this pressure to that already obtaining in chamber 52 and accordingly forcing the diaphragm 50 far enough out to allow full opening of the port controlled by valve 44. An ample flow of motive fluid will then pass out through the by-pass chamber and passage 49 to the valve motor, and this will result in shutting off the particular heat unit controlled by that valve motor. Should a fall in temperature ensue, the thermostatically-controlled variable-pressure mechanism will reduce the pressure in chamber 52, whereupon the diaphragms of that chamber will move inwardly under the action of the spring 62', first closing valve 44, thus shutting off the flow of full pressure to the valve-motor and thereafter in the further inward movement of the diaphragms, opening valve 58, thus venting the by-pass chamber 41 to the atmosphere past the loosely fitting stem of valve 58 and thereby relieving the valve motor diaphragm of restraining pressure, whereupon the motor will open its radiator valve under the action of its motor springs.

9 represents as a whole the regulating thermostat shown more in detail in Fig. 6. Referring to Fig. 6, 72 designates a frame plate, 73 a tubular extension at the central part of the plate, and 74 a bridge frame member mounted upon the frame plate at the opposite side of the tubular extension; these three members constituting the main frame of the device. A detachable skeleton cover 75 is arranged to protect the mechanism upon the front side of the plate, as usual. An inner tube or sleeve 76 is mounted to extend through the tubular frame extension 73 and is susceptible of endwise movement therein, and upon the end of this inner tube is mounted a yoke frame 77, within which is supported a hollow expansion disk 78 containing a volatile liquid, which will be partly converted into gas at a temperature somewhat below that at which the thermostat is designed to come into action; this expansion disk *per se* being of well understood construction. The outer side of this disk rests at its center against a fixed support, as 79, while its opposite face engages the end of an actuating rod 80 mounted to extend loosely through the inner tube 76 and into proximity to the inner side of the central part of the bridge frame 74. Within the bridge frame is formed a chamber 81, one side of which is formed by a flexible diaphragm 82 having its periphery clamped to the frame, as indicated at 83, and its central portion connected with a valve housing 84. Through the valve housing is formed a port through which extends a vent valve 85 which operates against a seat 86 and so closes the vent passage. Valve 85 is acted upon by a coiled spring 87 tending to normally lift it from its seat. Within a nipple-like extension upon the outer side of the frame member 74 is formed a chamber 88, and from this chamber a port or passage extends to chamber 81; the inner end of this port terminating in a valve seat 89 surrounding a reduced part of the port. An admission valve 90 extends through this port and is normally held against the seat 89 to close the port by means of a coiled expansion spring 91 interposed between the head of the valve and a screw-cap 91'. The tip of the valve 90 projects through the port into the chamber 81 in position to be engaged by the head of the vent valve 85.

Two ducts 92 and 93 are formed to extend through the upper half of the bridge frame, one of these, 93, communicating with the valve chamber 88, and the other with the chamber 81, as indicated in dotted lines at 94.

Assuming air to be supplied through duct 93 under substantially constant pressure, normally the admission valve 90 would be closed and entrance of the air to the chamber thus prevented, while the vent valve 85, if the expansion disk be sufficiently collapsed, will be open. If, now, the expansion disk expands under a rise of temperature sufficiently to move the actuating rod 80, the latter will engage and force inwardly the valve housing 84, first seating and closing the vent valve (the spring of the latter being weaker than that controlling the admission valve) and thereafter through the engagement of valve 85 with the admission valve, lift the latter and so admit pressure to chamber 81. The pressure in this chamber acting on its diaphragm will oppose the expansive action of the disk, and as soon as sufficient pressure is admitted to counterbalance that exerted by the expansion disk, the diaphragm of chamber 81 will be forced outwardly by spring 88, and the admission valve will return to its seat. Should the outside temperature continue to rise, the expansion disk will presently again open the admission valve and equilibrium again be established at a higher pressure. In other words, the pressure obtaining in chamber 81 and that part of the system beyond and in communication with that chamber will always be a pressure which counterbalances the expansive pressure of the vapor in the expansion disk at the particular temperature to which the latter is at the time subject. This variable pressure is utilized for successively operating the series of relays $8^a$, $8^b$ and $8^c$, and these relays in turn control the corresponding valve motors $6^a$, $6^b$, $6^c$.

In order that the thermostat may be adjusted so as to come into effective operation at any predetermined temperature, an adjustment is provided between the actuating rod which is moved by the expansion disk and the tubular frame member 76 which carries the expansion disk. To this end the tubular frame 76 is adjustably connected and held in fixed relation to the main frame through the medium of an adjusting lever 97, the upper end of which is formed to embrace the end of the frame member 76 and connected with the latter by means of a through-pin 98. In order that this through-pin may not interfere with free movement of the actuating rod, the latter is longitudinally slotted, as indicated at 99, to receive the through-pin. The lower end of lever 97 is supported upon a rotatable adjusting screw 100 and its intermediate portion fulcrumed against a stud 101 mounted in the lower part of the bridge frame 74. The forked upper end of the lever is actuated by a plate-spring 102 secured thereto and bearing against the upper part of the bridge frame. By rotating the adjusting screw, the lever 97 is oscillated positively, in one direction against the tension of the spring 102 and in the other with the spring, thus shifting the tubular frame 76 bodily. Inasmuch as this amounts to effecting a relative approach or departure between the expansion disk and actuating rod, the desired adjustment is effected. A graduated disk 104 is secured upon the adjusting screw 100 and coöperates with a fixed pointer or indicating mark 105 upon the bridge frame. The end of screw 100 is squared to receive a lever whereby it may be actuated. The thermostat 9 is so proportioned and adjusted that it will be effective to cut out or bring into operation the entire series of heating units within a range of temperatures, say between the temperatures of 70° and 73°, or between 80° and 83°, or any other selected range. This three degree position of operation is adjustable so its action may be varied over a wide range, as for instance, from 70° to 150°; that is, while it will be operative over a range of three degrees, that range being sufficient to control the heating members and the damper 30, this operative range of three degrees may be at anywhere in the scale of temperatures between 70° and 150° or higher, as desired, according as the action of the thermostat is influenced by the master thermostat.

I do not wish to confine myself to the precise method shown and described for the control of the secondary or duct thermostat by the master thermostat, as any mechanical means by which the master thermostat effects the changing of the point of operation of the duct thermostat will be within the scope of my invention.

The main supply pipe 12 connects with a suitable source of compressed air under uniform pressure, and a branch pipe 13 conveys air from this main pipe to duct 93 and to the valve chamber 88 of the regulating thermostat 9; the outflow of air from said chamber being controlled by the expansible member 78 in such manner that increasing temperature in the main delivery duct 4 admits air of correspondingly increasing pressure from chamber 81, through duct 92 and to a pipe 14 which leads to and connects with the pressure compartments of the various relays $8^a$, $8^b$, $8^c$.

A pipe 12' connects with the main supply pipe 12, as indicated at 12" and leads thence to and connects with the duct 48 and by-pass chamber 41 of each of the several relays and from the opposite side of said valve chamber of the relays pressure delivery pipes $15^a$, $15^b$ and $15^c$, respectively, lead to the diaphragm compartments of the valve motors $6^a$, $6^b$ and $6^c$. The supply of graduated air pressure coming in through the pipe 14 to the several relays operates the latter successively in accordance with the tension of their respective springs 62', while the supply of compressed air of uniform pressure coming in through the pipe 12' passes through the relays, when the latter operate, to the valve motors at full pressure.

Associated with the intake chute 1 is the master thermostat 17, the expansible member 16 of which is arranged to extend freely within the duct, as best seen in Figs. 1 and 2, while the valve mechanism and main frame is mounted upon the outside of the wall of the duct for convenience of access, etc., as shown clearly in said Fig. 2. The master thermostat is, or may be, practically identical with the secondary or heat regulating thermostat 9, except that it is organized to operate over the entire range of ordinary outside normal temperatures, say from 70° to 0° Fahrenheit. In a word, this master thermostat may be identical with the thermostat designated 1 in my Patent No. 961,734 and first described in Patent No. 764,819 to W. P. Powers.

A pipe 18 connects the intake side of the master thermostat with the pipe 12 and hence with a source of uniform pneumatic pressure, while a return pipe 19 connects the delivery side of said master thermostat with a diaphragm motor 20 mounted in convenient operative relation to the secondary or heat-regulating thermostat 9. Said diaphragm motor 20 may be of any well-known construction, as for example, that shown in my said Letters Patent No. 961,734 and designated 87 therein, and it consists essentially of a diaphragm chamber with which the pipe 19 communicates, and the outward movement of the diaphragm whereof is resisted by springs. The central portion of the diaphragm is directly connected with a lever 21, fulcrumed at one end, as at 22, to the frame of the diaphragm motor; the other end of the lever being connected by a link 23 with the end of lever 24, which engages the squared end of the adjusting screw 100 of the thermostat 9 (Fig. 6). Clockwise rotation of the lever 24 results in bodily movement of the expansible member away from the valve mechanism and counter clock-wise rotation of said lever moves the expansible member toward the valve mechanism.

A branch pipe 25 leads from the eduction or delivery side of the thermostat 9 to a diaphragm motor 26, essentially like the diaphragm motor 20, and having its diaphragm connected with the inner end of a lever 27, pivoted at 28, and connected at its opposite end through link 29 with a pivoted graduating damper 30 which controls the by-pass 31 for admitting unheated air to the fan through the passage below the radiators or heating units. The arrangement of this damper mechanism is such that increasing temperature in the main delivery duct, and consequent increase of pressure in the pipe connected with the delivery side of the thermostat 9, will actuate the diaphragm motor 26 to gradually open the damper 30 so that more outside air can flow directly to the fan through the lower part of the delivery duct.

The operation of the system organized as described may be briefly described as follows: Assume that the outside temperature is very low, and that the heating system is to be started. The temperature at the master thermostat being low, the pressure of the air delivered therethrough to the diaphragm motor 20 is also low, and the diaphragm of the latter is therefore collapsed and the thermostat 9 at the high temperature limit of its range of adjustment. With such assumption of low outside temperature, all of the heating units or radiators will be in operation, and the damper 30 (which ends to close normally) will be closed. Assuming that the air delivered through the main delivery duct is under such conditions heated too much, the thermostat 9 would be operated by such excess temperature (without necessarily being re-adjusted through the medium of the master thermostat) and admit an increasing pressure to the pipes 14 and 25 connected with its delivery side, which increase of pressure would first gradually actuate the damper motor 26 and thus partially open the graduating damper 30 thereby tending to admit some cold air, and, by admixture, to lower the temperature of the air in the main delivery duct. Should this regulation not arrest the rising temperature and consequent rising pressure from thermostat 9, the pressure would presently be high enough to operate the first relay 8ª of the relays, and, through the medium of the latter, shut off the corresponding radiator. Should the shutting off of this radiator sufficiently lessen the heat of the delivered air to bring it below the temperature at which the thermostat 9 is adjusted to hold it, the decrease in pressure at the delivery side of the controlling regulator would permit the damper 30 to gradually close until finally a part or even all of the cold air would be excluded from entering through the by-pass. On the other hand, if the temperature continued to rise in spite of the shutting off of the first radiator, the increase in pressure at the delivery side of the controlling thermostat would presently bring about the shutting off of the second radiator and the opening of damper 30 to a greater degree, and so on through the series. When the last radiator is shut off, damper 30 will be fully opened. Assuming, again, that we start with a low outside temperature, and the weather moderates very substantially, so that the outside temperature becomes considerably higher. Under such conditions it will be obvious that the air to be delivered to the apartments should be of lower temperature, since as the weather becomes warmer, the rate of cooling of the air in the building becomes slower. In such case the rise in outside temperature operates the master thermostat, and, through the diaphragm motor 20, re-adjusts the thermostat 9 so that it will in turn govern the heating apparatus in such manner as to deliver cooler air. In this manner it will be obvious that the regulating system is fully automatic for all ordinary ranges of temperature, and having once been properly adjusted it requires no further attention.

It is usual and preferable to provide additional automatic means for regulating the admission of the heated air to each of the several apartments to be heated. If such means be provided it is preferable that the damper which controls the admission to the apartment should never entirely close, so that it will at no time completely shut off the admission of air because it is desirable to admit a sufficient amount of air to afford good ventilation, hence it becomes necessary to so limit the temperature of the air admitted to each apartment as to render the entire closing of the damper of such apartment unnecessary. Accordingly each apartment may be provided with a thermostatic device, as 32, as shown in the present instance, connected with the compressed air supply through pipe 33, and delivering variable pneumatic pressure to a pneumatic motor 34 through pipe 35. The motor is connected through lever mechanism with a damper 36' which controls the outlet 37' of the branch duct 5. Rising temperature in the apartment causes the actuation of the motor to move the damper toward its closed position, and vice versa decreasing temperature permits the damper to automatically open.

A cut-out, consisting of an ordinary stop and waste valve, is placed in the return at 40, by means of which the control of the radiator section and the damper 30 may, if desired, be eliminated; it being sometimes desirable to heat the building as quickly as possible and hence to prevent automatic control during such heating.

While the herein described system constitutes a preferred embodiment of the invention, yet it is to be understood that the invention is in no wise to be limited to the particular details of construction and arrangement shown in the drawings. For example, while I have herein shown steam heated radiators as constituting the heating units, nevertheless other forms of heating units may be substituted, together with such modifications as to the manner of regulating and controlling the same, as are necessary, and will be readily supplied by those skilled in the art.

I claim as my invention:

1. In a heating and ventilating system, the combination of means for heating air, means for delivering the heated air, a controlling thermostat affected by the heat of the delivered air, connected to control the heat thereof and adjustable to raise and lower the range of temperatures over which it is effective, and a master thermostat located to be affected by the temperature of the out-door air to be heated and serving to effect the adjustment of the controlling thermostat.

2. In a heating and ventilating system, the combination of an intake chute communicating at its inlet with outside air, means at the outlet end of said chute for drawing air through said chute, heaters interposed in said chute between the inlet and outlet ends thereof for heating the air flowing through said chute, an adjustable controlling thermostat influenced by the temperature of the outflowing air, pressure-controlled mechanism for regulating said heating mechanism, the pressure in said pressure-controlled mechanism being controlled by said adjustable thermostat in accordance with the temperature of the outflowing air, and thermostatic mechanism, controlled by the temperature of the inflowing air, arranged to automatically control the adjustment of said adjustable controlling thermostat.

3. In a heating and ventilating system, the combination of heating mechanism for heating air, means for delivering the heated air, a controlling thermostat influenced by the temperature of the delivered air, means controlled by said thermostat for regulating the heating mechanism, said thermostat being adapted to be set for operating through varying ranges of temperature, and means controlled by the temperature of the air to be heated for automatically controlling the setting of said thermostat.

4. In a heating and ventilating system, the combination of heating mechanism for heating air, means for delivering the heated air, a thermostat influenced by the temperature of the delivered air, means controlled by said thermostat for regulating the heating mechanism, said thermostat being adapted to be set for operating through varying ranges of temperature, and a master thermostat mechanism for automatically controlling the setting of said first mentioned thermostat in accordance with the temperature of the air to be heated.

5. In a heating and ventilating system, the combination of a structure forming an inlet passageway, heater mechanism in said passageway, means for drawing outside air through said passageway to be heated by said heating mechanism and for delivering the heated air, pressure-controlled valve mechanism for said heating mechanism, a source of pressure, a pressure-controlled relay for determining the connection of each pressure controlled valve with said source of pressure, a secondary thermostat controlled by the temperature of the delivered air, valve mechanism controlled by said thermostat for gaging the pressure of said relays, said thermostat being adapted to be set to operate through varying ranges of temperature, and master thermostatic mechanism for controlling the setting of said first mentioned thermostat in accordance with the temperature of the outside air to be heated.

6. In a heating and ventilating system, the combination of an air heating chamber through which the supply of air enters, a series of heating members arranged in said chamber, a pneumatically-controlled valve for each heating member, a series of pneumatically-controlled relays operable at different stages of pressure and connected to transmit motive fluid under pressure to said valves, means for drawing air through said chamber and for delivering heated air, a thermostatic element located to be controlled by the temperature of the delivered air, fluid pressure varying mechanism controlled by said thermostatic element to transmit fluid under pressure to actuate said relays, and means for automatically effecting relative adjustment between said thermostatic element and the pressure controlling mechanism controlled thereby in accordance with the temperature of the air to be heated.

7. In a heating and ventilating system, the combination of an air heating chamber through which the supply of air enters, a series of heating members arranged in said chamber, a pneumatically-controlled valve for each heating member, a series of pneumatically-controlled relays operable at different stages of pressure and connected to transmit motive fluid under pressure to said valves, means for drawing air through said chamber and for delivering heated air, a thermostatic element located to be controlled by the temperature of the delivered air, fluid pressure varying mechanism controlled by said thermostatic element to transmit fluid under pressure to actuate said relays, and additional thermostatic mechanism subject to the air to be heated to control relative adjustment between the said thermostatic element and the pressure-controlling mechanism controlled thereby in accordance with the temperature of the air to be heated.

8. In a heating and ventilating system, the combination of an air heating chamber through which the supply of air enters from the outside, a series of heating members arranged in said chamber, a pneumatically-controlled valve for each heating member, a series of pneumatically-controlled relays operable at different stages of pressure and connected to transmit motor fluid under pressure to said valves, a source of pressure, a main thermostat connected with said pressure source and with said relays and positioned to be thermally affected by the delivered air and arranged to vary the pressure of the flow to the relays whereby said relays are successively controlled to effect successive operation of the pneumatically-controlled valves of the heating members, a pressure-controlled member connected with said main thermostat and arranged to adjust the range of operation thereof, and a master thermostat subjected to the outside air and connected with said source of pressure and said pressure-controlled member to cause said pressure-controlled member to adjust said main thermostat in accordance with the outside temperature.

9. In a heating and ventilating system, the combination of a heating chamber, heating mechanism in said chamber, means for causing circulation of outside air through said chamber in proximity to said heating mechanism and for delivering the heated air, a by-pass for allowing unheated air to flow through said chamber to be delivered with the warm air, a thermostat controlled by the temperature of the delivered air, means automatically operated by said thermostat to control the heating mechanism, additional means operated by said thermostat to control the flow through said by-pass, said thermostat being adapted to be set for varying temperature ranges, and a master thermostat affected by the outside air and arranged to automatically control the setting of said first mentioned thermostat.

10. In a heating and ventilating system, the combination of means for heating air, means for delivering the heated air, a controlling thermostat affected by the heat of the delivered air and connected to control the heat thereof and adjustable to raise and lower the range of temperatures over which it is effective, and a master thermostat entirely independent of said heating means and located to be affected by the temperature of the outdoor air to be heated and serving only to effect the adjustment of the controlling thermostat.

In witness hereof, I hereunto subscribe my name this 11 day of June, A. D., 1910.

DONALD J. POWERS.

Witnesses:
DOUGLAS MACCALLUM,
JENNIE M. RUDDY.